United States Patent [19]
Nagashima et al.

[11] Patent Number: 4,624,498
[45] Date of Patent: Nov. 25, 1986

[54] SEAT SLIDING DEVICE OF A VEHICLE

[75] Inventors: Hideyuki Nagashima; Kouzo Maeda, both of Yokohama, Japan

[73] Assignee: Nissan Motor Co., Ltd., Yokohama, Japan

[21] Appl. No.: 734,820

[22] Filed: May 16, 1985

Related U.S. Application Data

[63] Continuation of Ser. No. 454,548, Dec. 30, 1982, abandoned.

[30] Foreign Application Priority Data

Jan. 21, 1982 [JP] Japan ............................. 57-6601[U]

[51] Int. Cl.⁴ ............................................. B60N 1/08
[52] U.S. Cl. .................................. 296/65 R; 248/430; 384/47
[58] Field of Search ............. 296/65 R; 248/429, 430; 308/3.6, 3.8

[56] References Cited

U.S. PATENT DOCUMENTS

| | | | |
|---|---|---|---|
| 1,943,550 | 1/1934 | Potter | 248/430 |
| 2,927,627 | 3/1960 | Lohr | 248/429 |
| 3,099,232 | 7/1963 | Cooper | 308/3.8 |
| 3,450,425 | 6/1969 | Leonhardt | 248/430 |
| 4,168,050 | 9/1979 | Nerem et al. | 248/430 |
| 4,478,383 | 10/1984 | Urai | 248/430 |

FOREIGN PATENT DOCUMENTS 1090981 10/1960 Fed. Rep. of Germany .

Primary Examiner—Robert B. Reeves
Assistant Examiner—Dennis H. Pedder
Attorney, Agent, or Firm—Schwartz, Jeffery, Schwaab, Mack, Blumenthal & Evans

[57] ABSTRACT

A stationary rail of generally channel-shaped construction is secured to the vehicle floor so as to have an elongate opening thereof oriented to the direction of movement of a seat mounted thereover. The stationary rail has a coaxially extending main portion or section and coaxially extending guided and guiding portions or members. A movable rail connected to the seat has throughout the length thereof the same cross section as the stationary rail. The movable rail is slidably engaged with the stationary rail in such a manner that the guided and guiding portions thereof are engaged with the corresponding guided and guiding portions of the movable rail in a mutually inverted relationship, having the main portion thereof and the corresponding truck portion of the movable rail spaced. Rollers are embraced by the stationary and movable rails in such a manner that the cylindrical outer surface of each roller engages with both the main portions of the stationary and movable rails.

6 Claims, 5 Drawing Figures

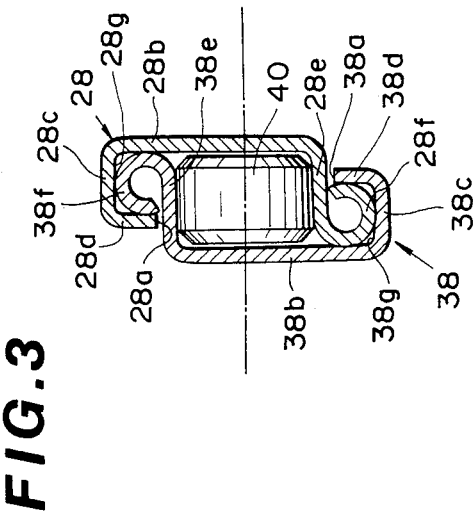
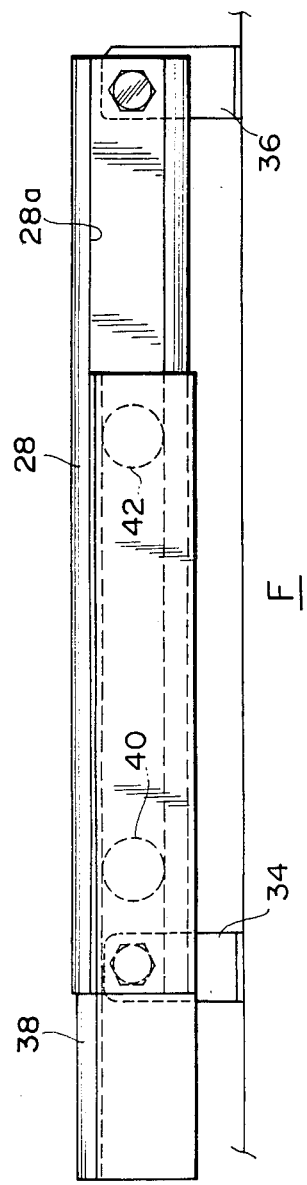

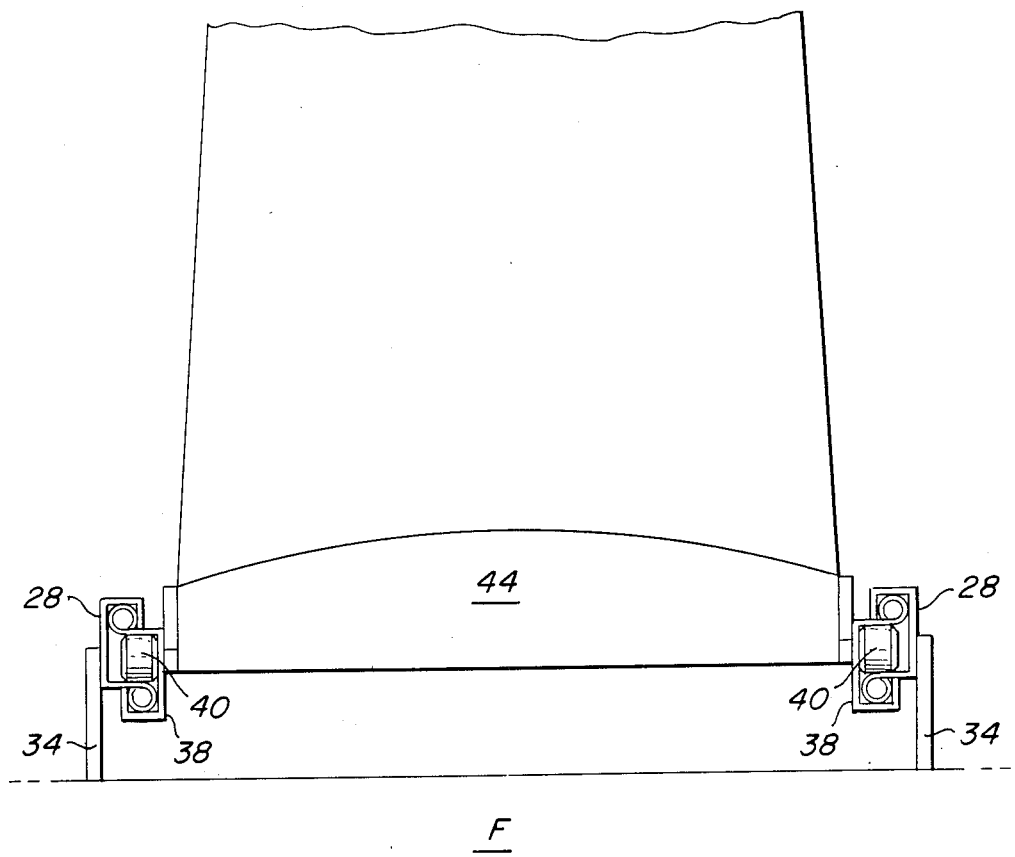

SEAT SLIDING DEVICE OF A VEHICLE

This application is a continuation of application Ser. No. 454,548, filed Dec. 30, 1982, now abandoned.

BACKGROUND OF THE INVENTION

The present invention relates to a seat sliding device of a vehicle, and more particularly to a device of a type which uses rollers for improving the seat sliding characteristics thereof.

SUMMARY OF THE INVENTION

According to the present invention, there is provided an improved seat sliding device for a motor vehicle, which assures smooth sliding movement of the seat relative to the vehicle floor even when a heavy load is applied thereto.

The seat sliding device of the invention comprises an elongate stationary rail having a generally channel-shaped construction and secured to the vehicle floor in such a manner that the axially extending opening thereof is oriented laterally with respect to the seat mounted thereover. The stationary rail has a coaxially extending truck portion and coaxially extending first and second guiding portions. An elongate movable rail is connected to the seat to move therewith. The movable rail has throughout the length thereof a cross section identical to that of the stationary rail and is slidably engaged with the stationary rail in such a manner that the first and second guiding portions of the stationary rail are engaged with the corresponding guided portions of the movable rail in a mutually inverted relationship, the truck portion of the stationary rail and the corresponding truck portion of the movable rail being spaced apart from one another. A plurality of rollers are embraced by the mutually engaged stationary and movable rails in such a manner that the cylindrical outer surface of each roller engages with both the truck portions of the stationary and movable rails.

BRIEF DESCRIPTION OF THE DRAWINGS

Objects and advantages of the present invention will become apparent from the following description when taken in conjunction with the accompanying drawings, in which:

FIG. 3 is a sectional view taken along the line III—III of FIG. 2; and

FIG. 4 is a view similar to FIG. 2, but showing a different position of the device; and FIG. 5 is a front view of the seat sliding device of the invention.

BRIEF DESCRIPTION OF THE INVENTION

Figure 1:
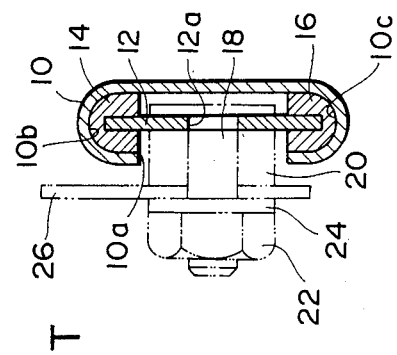
FIG. 1 is a sectional view of a conventional seat sliding device.
Figure 2:
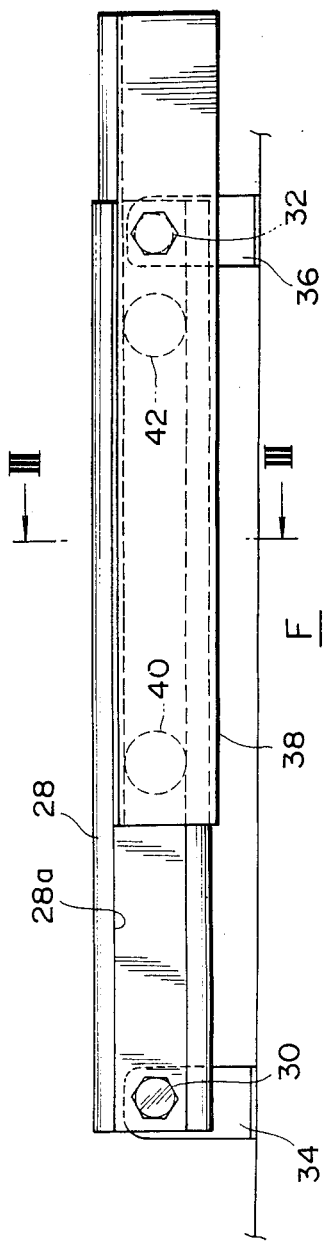
FIG. 2 is a side view of a seat sliding device according to the present invention.

Prior to describing the invention, a conventional seat sliding device will be outlined with reference to FIG. 1 in order to clarify the invention.

Referring to FIG. 1, a sectioned view of a conventional seat sliding device is provided. Although not shown, a seat is mounted on the device and achieves its sliding movement relative to a vehicle floor (not shown) on which the device is arranged. The device comprises generally an elongate stationary rail 10 having a C-shaped cross section, as shown. The rail 10 is secured to the vehicle floor and is arranged so as to have the elongate opening 10a thereof oriented laterally with respect to the seat. An elongate movable rail 12 is axially movably received in the stationary rail 10. For improving the sliding, the movable rail 12 is provided at its upper and lower sides with sliding blocks 14 and 16, made of, for example, plastics, which are slidably engaged with the curved inside surfaces 10b and 10c of the stationary rail 10. The movable rail 12 is formed with openings 12a through which headed bolts 18 pass. An annular spacer 20 is mounted on each bolt 18. A nut 22 and a washer 24 are engaged with the threaded portion of each bolt 18 in order to fasten a bracket 26 to the bolt 18 and thus to the movable rail 12. The bracket 26 is secured at its upper portion to the frame construction of the seat, so that the movement of the seat is carried out by sliding the movable rail 12 along the stationary rail 10. Because the bracket 26 is not coaxial with the stationary and movable rails 10 and 12, the rails are loaded in an off axial manner.

However, this seat sliding device has suffered from the drawback that substantially all of the weight of the seat assembly is supported by only the lower section of the device, that is to say, by the curved inside surface 10c of the stationary rail 10 and the sliding block 16 of the movable rail 12. The increase in weight of the seat assembly by a seat occupant sitting thereon therefore tends to deform the sliding block 16, thereby disabling the smooth sliding of the movable rail 12 relative to the stationary rail 10. Furthermore, it has been revealed that long use of the device causes a considerable wearing-out of the block 16, which also induces non-smooth sliding of the movable rail 12.

To eliminate the above-mentioned drawback is an essential object of the present invention.

DETAILED DESCRIPTION OF THE PREFERRED EMBODIMENTS

Referring to FIGS. 2 to 5, there is shown a seat sliding device according to the present invention, which is free of the above-mentioned drawback. A seat 44 (FIG. 5) is mounted on the device to achieve its sliding movement relative to the vehicle floor F on which the device is arranged. The device comprises an elongate stationary rail 28 having a generally channel-shaped construction and connected to the vehicle floor F. As will be described in detail hereinafter, an elongate movable rail 38 having the same cross section as the stationary rail 28 is longitudinally slidably engaged with the stationary rail 28 through rollers 40 and 42. As in the prior art, the device of the invention is loaded in an off axial manner, as can be seen in FIG. 5.

The stationary rail 28 comprises, as is seen from FIG. 3, a vertical flat portion 28b, an upper horizontal flat portion 28c with a downwardly bent end 28d, a lower horizontal flat portion 28e, and a curled portion 28f extending from the lower flat portion 28e, all these portions extending along the axis of the rail 28. As is clearly visible in the drawing, curled portion 28f recurves at least three-quarters (270°) around a longitudinal axis passing through its center of curvature. As can also be seen from the drawing, the portions 28b, 28c and 28d are arranged to constitute a channel, and the bent end 28d extends inward of the channel to form a guiding groove 28g at one side of the channel. The curled portion 28f projects outward to form a guiding portion. As is seen from FIG. 2, the stationary rail 28 is connected at its longitudinal ends, by bolts 30 and 32, to supporting brackets 34 and 36 secured to the vehicle floor F. The rail 28 is arranged to have the elongate opening 28a thereof oriented laterally with respect to the seat mounted thereover.

The curled portion 28f together with lower flat portion 28e comprise a guided member. The channel comprised of portions 28c, 28d, and part of 28b comprises a guiding portion. The rest of 28b comprises a main section.

Axially slidably engaged with the stationary rail 28 is an elongate movable rail 38 which has, throughout the length thereof, a cross section identical to that of the stationary rail 28. Thus, portions of the movable rail 38 corresponding to those of the stationary rail 28 are designated by affixing the same letter to the numeral 38, in the drawings. As is understood from the drawings, the movable rail 38 is slidably engaged with the stationary rail 28 having the at least 270° curled portion 38f thereof received in the guiding groove 28g of the stationary rail 28, and having the guiding groove 38g thereof, defined by portions 38b, 38c, and 38d, thereof receiving the curled portion 28f of the stationary rail 28. It can be seen in the drawing that curled portion 28f substantially fills guiding groove 38g, and that the same is true of curled portion 38f with respect to guiding groove 28g. Thus, the guided members substantially fill the guiding members. That is to say, the movable and stationary rails 38 and 28 have cross sections which are identical and which permit one to be interlocked with the other in a mutually inverted configuration. Curled portions 28f and 38f preferably contact the respective guiding portions of the channels at two points, viz., 28b, 38b and 28d, 38d. This minimizes frictional interaction while at the same time providing minimal clearance. A suitable bracket is secured to the movable rail 38 to connect the movable rail 38 with the seat.

Two rollers 40 and 42 are embraced by the stationary and movable rails 28 and 38 in such a manner that the cylindrical outer surface of each roller engages with or runs on the flat portions 28e and 38e of each nail, respectively. In other words, the rollers 40 and 42 are disposed within a longitudinal channel seen end-on in FIG. 3. In the described embodiment, this channel is substantially rectangular. The channel is formed on the sides by the opposed interior faces of the main sections of the rails, and top and bottom by the opposed interior faces of the guided members.

Although not shown in the drawings, another seat sliding device having identical construction to the above-mentioned device is arranged beside the mentioned one for achieving stable sliding movement of the seat.

With the above-stated construction of the invention, it will be appreciated that the axial movement of the movable rail 38 induces rolling of the rollers 40 and 42 on the flat truck portions 28e and 38e of the stationary and movable rails 28 and 38, which permits smooth sliding movement of the seat. During the movement of the movable rail 38, the curled portion 38f and the groove portion 38g thereof are positively guided by the associated guiding portions 28g and 28f of the stationary rail 28, preventing disengagement of the movable rail 38 from the stationary rail 28. Of course, the rollers 40 and 42 are of rigid material of sufficient stiffness that it can support the weights of both the seat assembly and the occupant to be seated thereon. As the movable and stationary rails may be produced simply by cutting off lengths of the same stock, mass production may be facilitated and invisible costs reduced.

What is claimed is:

1. A seat sliding device of a vehicle, comprising:
   an elongate stationary rail secured to a floor of said vehicle and having a channel-shaped longitudinal guiding member, a curl-shaped longitudinal guided member, and a longitudinal main section transversely interposed between and connecting said guided member and said guiding member, the guided member projecting downwardly from the main section through an angle of at least 270 degrees;
   an elongate movable rail connected to a seat in said vehicle to move therewith, said movable rail having, throughout the length thereof, a cross section identical to that of said stationary rail and so having a longitudinal guiding member, a longitudinal guided member, and a longitudinal main section transversely interposed between and connecting said guided member and said guiding member, and being slidably engaged with said stationary rail in such a manner that said guided and guiding members of said stationary rail are engaged with the corresponding guiding and guided members, respectively, of said movable rail in a mutually inverted relationship, said guided members being respectively received within and contacting inner surfaces of said guiding members; and
   a plurality of rollers disposed within a longitudinal channel formed by opposed interior faces of said main sections and opposed interior faces of said guided members;
   wherein during off axial loading of said rollers, each of said guided members engages with the respective guiding member in a manner to minimize frictional interaction while providing minimal clearance.

2. A seat sliding device as claimed in claim 1, wherein each of said guiding members is channel-shaped.

3. A seat sliding device as claimed in claim 1, wherein each of said guiding members is channel-shaped.

4. A seat sliding device as cliamed in claim 3, wherein each of said curled guided members contacts the respective channel-shaped guiding member at two points.

5. A seat sliding device as claimed in claim 1 wherein said guided members substantially fill said respective guiding members.

6. A seat sliding device of a vehicle having a floor, comprising:
   an elongate stationary rail including a vertical flat portion (28b), an upper horizontal flat portion (28c) extending from an upper end of said vertical flat portion, a downwardly bent end (28d) formed at the leading end of said upper horizontal flat portion, a lower horizontal flat portion (28e) extending from a lower end of said vertical portion in the same direction as said upper horizontal flat portion, and a curled portion (28f) extending from the lower horizontal flat portion in a manner to be projected downward through an angle of at least 270 degrees, said upper horizontal flat portion, said downwardly bent end and the upper portion of the vertical flat portion constituting a channel-shaped guiding structure, and said curled portion constituting a tube-shaped guided structure;
   an elongate movable rail (38) connected to said seat to move therewith, said movable rail having throughout the length thereof a cross section identical to that of said stationary rail and so having a channel-shaped guiding structure and a curl-shaped guided structure, and being slidably engaged with said stationary rail in a telescoping and mutually inverted relationship so that the curl-shaped guided structure of said movable rail is slidably received on inner surfaces of the channel-shaped guiding structure of said stationary rail, and the channel-shaped guiding structure of said movable rail receives slidably therein on inner surfaces thereof the curl-shaped guided structure of said stationary rail; and a plurality of rollers (40, 42) embraced by the mutually engaged stationary and movable rails in such a manner that the cylindrical outer surface of each roller runs on both an inner surface of said lower horizontal flat portion of said stationary rail and a corresponding inner surface of said flat portion of said movable rail;

wherein during off axial loading of said rollers, each of said guided structures engages with the respective guiding structure in a manner to minimize frictional interaction while providing minimal clearance.

* * * * *